United States Patent
Lu et al.

(10) Patent No.: US 10,527,134 B2
(45) Date of Patent: Jan. 7, 2020

(54) CHAIN TENSIONER ARM OR CHAIN GUIDE FLAT FACE FEATURES TO ALLOW FACE ASSEMBLY FROM ONE END OF THE GUIDE OR ARM

(71) Applicant: BorgWarner Inc., Auburn Hills, MI (US)

(72) Inventors: XiaoJian Lu, Shanghai (CN); Jun Song, Shanghai (CN)

(73) Assignee: BorgWarner Inc., Auburn Hills, MI (US)

( * ) Notice: Subject to any disclaimer, the term of this patent is extended or adjusted under 35 U.S.C. 154(b) by 380 days.

(21) Appl. No.: 15/401,206

(22) Filed: Jan. 9, 2017

(65) Prior Publication Data

US 2018/0195583 A1   Jul. 12, 2018

(51) Int. Cl.
*F16H 7/08* (2006.01)
*F16H 7/18* (2006.01)

(52) U.S. Cl.
CPC ............... *F16H 7/08* (2013.01); *F16H 7/18* (2013.01); *F16H 2007/0872* (2013.01); *F16H 2007/185* (2013.01)

(58) Field of Classification Search
CPC ...... F16H 7/08; F16H 7/18; F16H 2007/0872; F16H 2007/185; F16H 2007/0893
See application file for complete search history.

(56) References Cited

U.S. PATENT DOCUMENTS

| | | | |
|---|---|---|---|
| 2002/0061799 A1* | 5/2002 | Young | F16H 7/18 474/111 |
| 2006/0205548 A1* | 9/2006 | Konno | F16H 7/18 474/111 |
| 2007/0029696 A1* | 2/2007 | Kurematsu | F16H 7/18 264/172.19 |
| 2009/0036242 A1* | 2/2009 | Hayami | F16H 7/18 474/111 |
| 2013/0035184 A1* | 2/2013 | Konno | F16H 7/18 474/111 |
| 2013/0090201 A1* | 4/2013 | Mori | F16H 7/18 474/140 |
| 2014/0057749 A1* | 2/2014 | Konno | F16H 7/18 474/111 |

(Continued)

FOREIGN PATENT DOCUMENTS

| | | |
|---|---|---|
| JP | 2000097300 | 4/2000 |
| WO | 2016069315 | 5/2016 |

*Primary Examiner* — Michael R Mansen
*Assistant Examiner* — Raveen J Dias
(74) *Attorney, Agent, or Firm* — Brown & Michaels, PC (57) ABSTRACT

A chain tensioner arm or chain guide includes a main body extending in a longitudinal direction and including side walls, each side wall defining a ledge. The main body has a first end including a first tab formed by a set of first grooves extending inwardly from the first end towards a center of the main body, and having a tab end. The tab end of the first tab includes a first protrusion extending away from the main body. The chain tensioner arm or chain guide also includes a shoe with a chain sliding surface on which the chain slides. The shoe includes a side protrusion extending in a longitudinal direction along each side of the shoe. The side protrusion fits into the ledge of the main body. Methods of assembling the tensioner arm or chain guide are also disclosed.

10 Claims, 12 Drawing Sheets

(56) References Cited

U.S. PATENT DOCUMENTS

| | | | |
|---|---|---|---|
| 2014/0243132 A1* | 8/2014 | Kurematsu | F16H 7/18 474/140 |
| 2015/0219190 A1* | 8/2015 | Geibel | F16H 7/18 474/111 |
| 2016/0069432 A1* | 3/2016 | Wach | F16H 7/18 474/111 |
| 2016/0290449 A1* | 10/2016 | Hirayama | F16H 7/18 |
| 2017/0248205 A1* | 8/2017 | Moster | F16H 7/08 |
| 2017/0321786 A1* | 11/2017 | Gomes | F16H 7/18 |
| 2017/0350474 A1* | 12/2017 | Fukuyama | F16H 7/08 |

* cited by examiner

CHAIN TENSIONER ARM OR CHAIN GUIDE FLAT FACE FEATURES TO ALLOW FACE ASSEMBLY FROM ONE END OF THE GUIDE OR ARM

BACKGROUND OF THE INVENTION

Field of the Invention

The invention pertains to the field of chain tensioner arms and chain guides. More particularly, the invention pertains to an improved chain guide or chain tensioner arm with a shoe (face).

Description of Related Art

In a chain device, e.g. a timing chain system in an automotive engine, a chain guide for guiding travel of a chain is generally provided on a tension-side of the chain, while a chain tensioner arm for applying a tensioning force to the chain is generally provided on a slack-side of the chain.

Conventional chain guides and chain tensioner arms include a main body section and a shoe made of resin, for example, which is provided on the chain abutment side of the main body section, as described in JP 2000-97300 A, herein incorporated by reference. The shoe is provided with a plurality of locking clips (see paragraph [0016] and FIGS. 1, 2, 4 and 6 of JP 2000-97300A), and the shoe is attached to the main body section by way of these locking clips.

In this conventional arrangement, protrusions such as these locking clips are provided on the shoe, which increases the complexity and cost of manufacturing.

PCT Publication WO 2016/069315, herein incorporated by reference, discloses a shoe without any clips. The shoe preferably has a uniform cross-sectional shape over the whole length or at least in a region excluding an end section of the shoe. Locking parts are provided on the guide main body and have a locking recess into which the shoe is inserted.

SUMMARY OF THE INVENTION

A tensioner arm or guide for applying tensioning force to a chain includes a main body extending in a longitudinal direction and including side walls, each side wall defining a ledge. The main body has a first end including a first tab formed by a set of first grooves extending inwardly from the first end towards a center of the main body, and having a tab end. The tab end of the first tab includes a first protrusion extending away from the main body. The tensioner arm or guide also includes a shoe with a chain sliding surface on which the chain slides. The shoe includes a side protrusion extending in a longitudinal direction along each side of the shoe. The side protrusion fits into the ledge of the main body.

In another embodiment, a tensioner arm or guide for applying tensioning force to a chain includes a shoe with a chain sliding surface on which the chain slides, having a first groove extending longitudinally inward from a first end, and comprising a shoe tab on each side of the first end extending away from the groove and a side protrusion extending in a longitudinal direction along each side of the shoe. The tensioner arm or guide also includes a main body extending in a longitudinal direction comprising side walls, each defining a ledge into which the side protrusion fits and a second groove into which the shoe tabs extend.

In another embodiment, a tensioner arm or guide for applying tensioning force to a chain includes a main body extending in a longitudinal direction comprising side walls, each defining a ledge, each side wall includes a tab formed on an end of the side wall, extending inwardly from the side walls towards a center of the main body. The tensioner arm or guide also includes a shoe with a chain sliding surface on which the chain slides. The shoe includes a side protrusion extending in a longitudinal direction along each side of the shoe. The side protrusion fits into the ledge of the main body. The tabs preferably have a length such that each tab extends inwards towards a center of the main body past a side of the shoe after assembly.

In a method of assembling a tensioner arm or guide for applying tensioning force to a chain, the tensioner arm or guide includes a main body and a shoe. The main body extends in a longitudinal direction and includes side walls, each side wall defining a ledge. The main body has a first end including a first tab formed by a set of first grooves extending inwardly from the first end towards a center of the main body, and having a tab end. The tab end of the first tab includes a first protrusion extending away from the main body. The shoe has a chain sliding surface on which the chain slides and includes a side protrusion extending in a longitudinal direction along each side of the shoe. The side protrusion fits into the ledge of the main body. The method includes the steps of exerting downward pressure on the tab to remove the first protrusion from a sliding path defined by the side protrusions of the shoe sliding into the ledge of the main body and inserting a first end of the shoe into the first open end of the main body.

DETAILED DESCRIPTION OF THE INVENTION

The present invention includes chain guides for guiding travel of a chain on a tension-side of the chain and chain tensioner arms for guiding travel of a slack-side of the chain. When embodiments are generally described herein with respect to a chain tensioner arm, they could alternatively be used in a chain guide, and vice versa. The terms "face" and "shoe" are used interchangeably herein.

In one embodiment, a chain guide includes a guide main body extending in the longitudinal direction and a shoe (also known as a face) which is reversibly attached to the guide main body and has a chain sliding surface on which the chain slides. The chain guide main body includes at least one tab on at least one end of the chain guide main body into which the shoe slides. The tab is formed by two grooves and includes an upward hook protrusion that prevents backwards movement of the shoe once it is assembled on the guide main body.

In another embodiment, a chain tensioner arm includes a tensioner arm main body extending in the longitudinal direction and a shoe which is reversibly attached to the tensioner arm main body and has a chain sliding surface on which the chain slides. The tensioner arm main body includes at least one tab on at least one end of the tensioner arm main body into which the shoe slides. The tab is formed by two grooves and includes an upward hook protrusion that prevents backwards movement of the shoe once it is assembled on the tensioner arm main body.

In other embodiments, the tabs are on the side walls of the main body instead of the end. In still other embodiments, the tabs are on the shoe.

The chain tensioner arm or chain guide and shoe described herein may be used in an engine timing system. Alternatively, the devices described herein may be applied to other chain devices, including, but not limited to, an auxiliary drive chain for an engine such as a balancer chain or an oil pump drive chain.

At least one end of the chain tensioner arm or chain guide is open and includes a surface or ledge onto which the shoe may slide during assembly. This end also includes a tab formed by grooves and including an upward hook protrusion, which prevents the shoe from sliding out after assembly. The tensioner arm or guide is lighter, easier to use, and more cost effective than prior art tensioner arms and guides.

In some embodiments, there is a press fit between the shoe and the body. In some preferred embodiments, the tensioner arm body or the guide body has a shape for press fitting between the shoe and the body. In these embodiments, the body has a narrower width on one end than along the rest of the body. In these embodiments, there is a single width for the shoe, and a narrower width at one end of the body.

In other preferred embodiments, the shoe has a shape for press fitting between the shoe and the tensioner arm or guide main body. In these embodiments, the shoe is wider at one end than along the rest of the shoe. There is preferably an inverted L-shaped wall on each side of a main body with a constant width and an increased or wider width on the shoe at one of the ends. The wider width still preferably fits into the side walls of the main body. The width of the shoe depends on chain width. The gap/interference between the face and body are checked by tolerance stack up with thermal impact (normally −40 C to 150 C in a timing chain system).

In other preferred embodiments, the shoe and the body both have a shape for press fitting between the shoe and the tensioner arm or guide main body. In these embodiments, the shoe is wider at one end of the shoe, and the body is narrower at the opposite end. In embodiments in combination with the hook and tab described herein, the body is narrower at the end opposite the hook and tab, and the shoe is wider at the same end of the shoe as the end where the tab is located.

The press fit features hold the shoe, and prevent it from moving freely when the tensioner arm or guide is in use.

In still other embodiments, the thickness of the shoe and/or body could vary to create the press-fit feature. For example, the shoe could have a larger thickness at one end than along the rest of the shoe. As another example, the body could be thicker at one of the ends than in the rest of the body. As a third example, the shoe could have a larger thickness at one end and the body could be thicker at the end opposite the end where the shoe is thicker. In embodiments with the hook and tab feature, the shoe would be thicker at the same end where the hook and tab are located, and/or the body would be thicker at the opposite end.

In some preferred embodiments, the tensioner arm body or guide body includes a continuous wall extending longitudinally along both sides of the body. The walls preferably include an inverted L shape that forms a ledge or groove longitudinally along the body into which the shoe slides. The ledge and L shape walls guide the shoe into the body during assembly. In other embodiments, the wall is discontinuous (for example a wall that includes a number of separated vertical tabs) but still creates a surface or ledge to guide and help hold the shoe.

The hook position and geometry could be modified and optimized to obtain same function. For example, the hook and tab could be placed at the open end of one of the sidewalls, extending inward towards a center of the main body base. As another example, the hook and tab could be placed on an end of the shoe instead of on an end of the main body.

In some embodiments, the body is made of plastic or resin. In other embodiments, the body is made of other materials including, but not limited to, powder metal or aluminum. The body may be made by any process for making tensioner arm or chain guide bodies including, but not limited to, a cold drawing process, a cold forming process, or a casting process. The tab portion of the body is preferably made of a flexible, resilient material that can bend easily.

The shoe is preferably made of plastic, resin or another flexible material that can bend easily. Some specific materials that could be used to make the face include, but are not limited to, PA66 (polyamide 66), PA46 (polyamide 46), PA66+PTFE (polyamide 66 and polytetrafluoroethylene), and PA46+PTFE (polyamide 46 and polytetrafluoroethylene). The shoe can be made by any process for making tensioner shoes including, but not limited to, injection molding or extrusion molding.

The examples in the figures are meant to describe either a chain tensioner arm or chain guide main body in combination with a shoe.

Figure 1A:
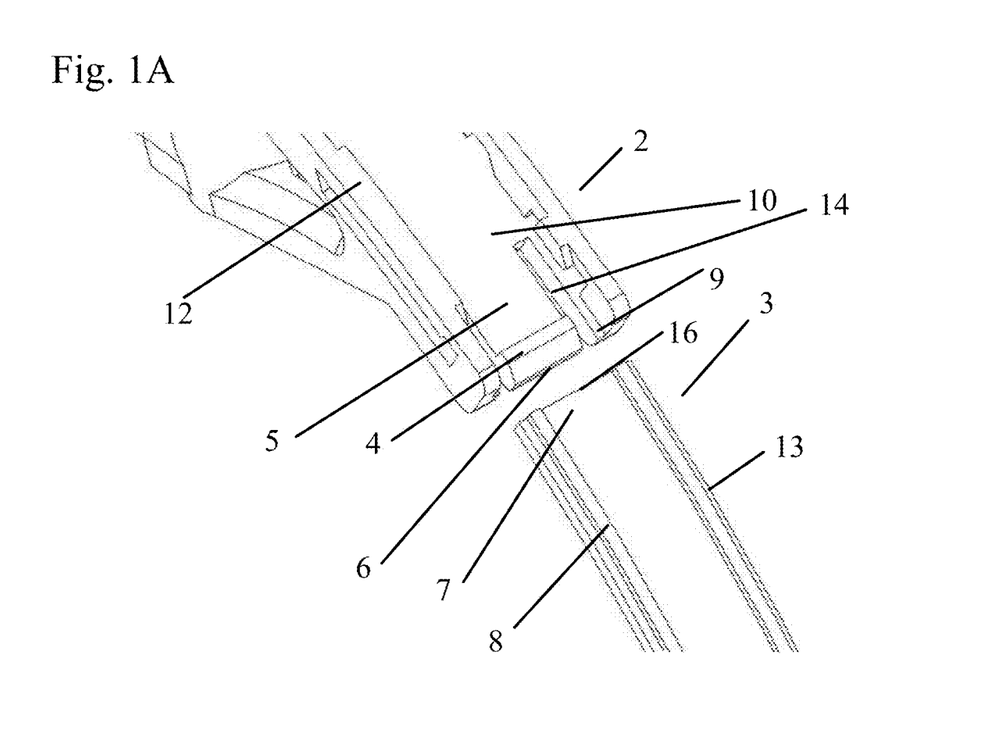
FIG. 1A shows a tensioner arm with the tab end of the main body and the end of the shoe in an embodiment of the present invention.
Figure 1B:
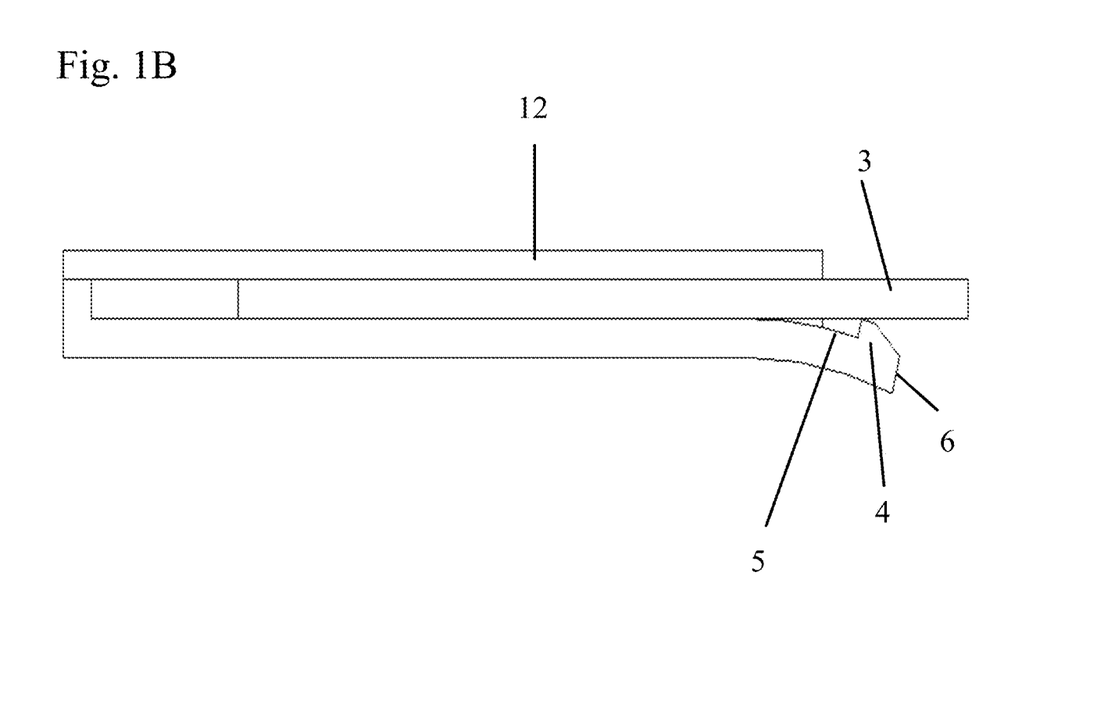
FIG. 1B shows a schematic of the deformed end hook and tab during assembly.
Figure 2A:
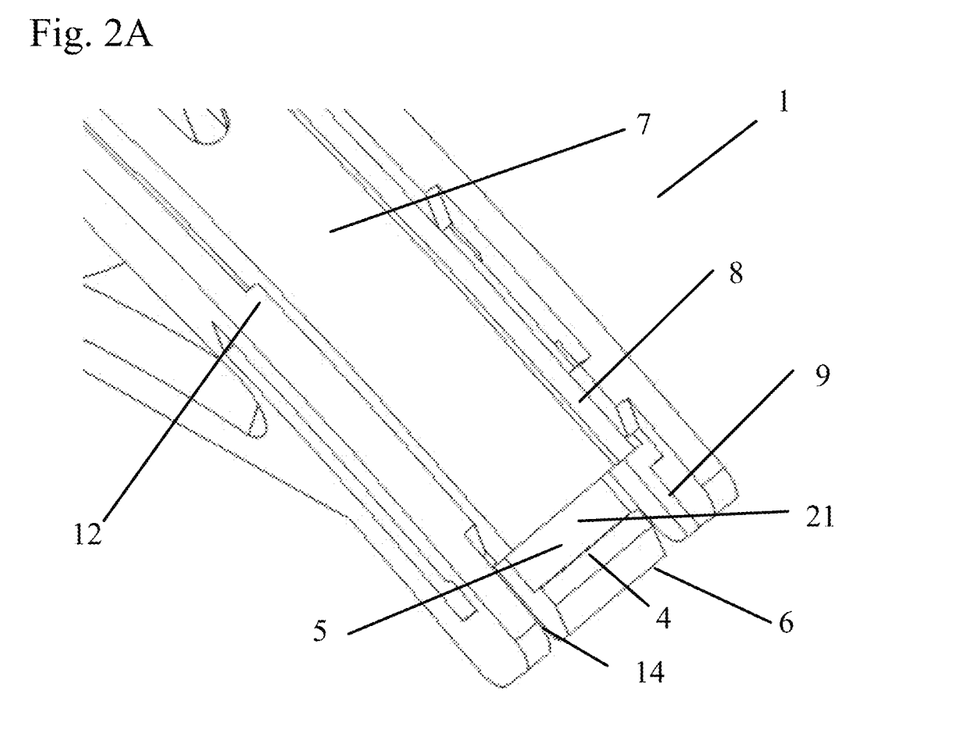
FIG. 2A shows a tensioner arm with the tab end of the main body with the face inserted into the main body.
Figure 2B:
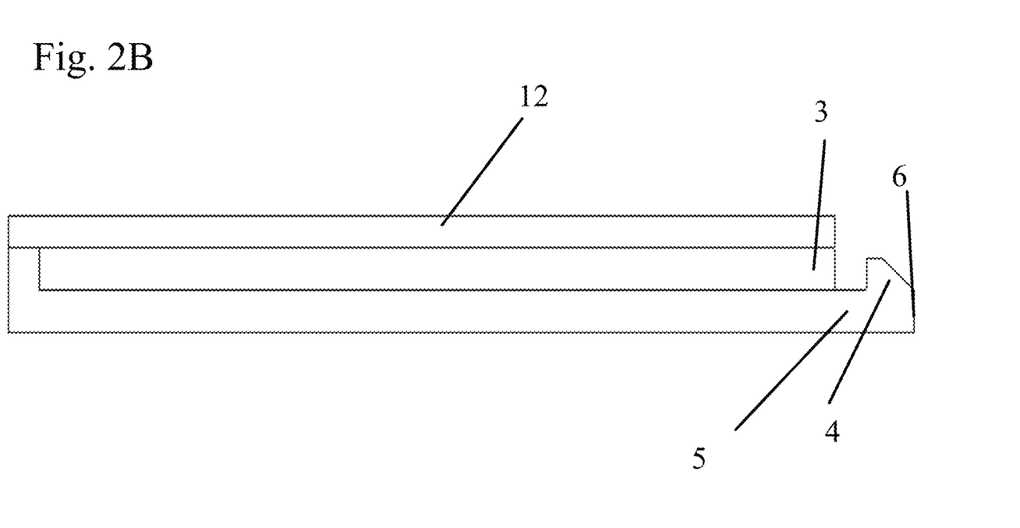
FIG. 2B shows a schematic of the tensioner arm of FIG. 2A, post assembly, with the hook and tab back in its original position.
Figure 3:
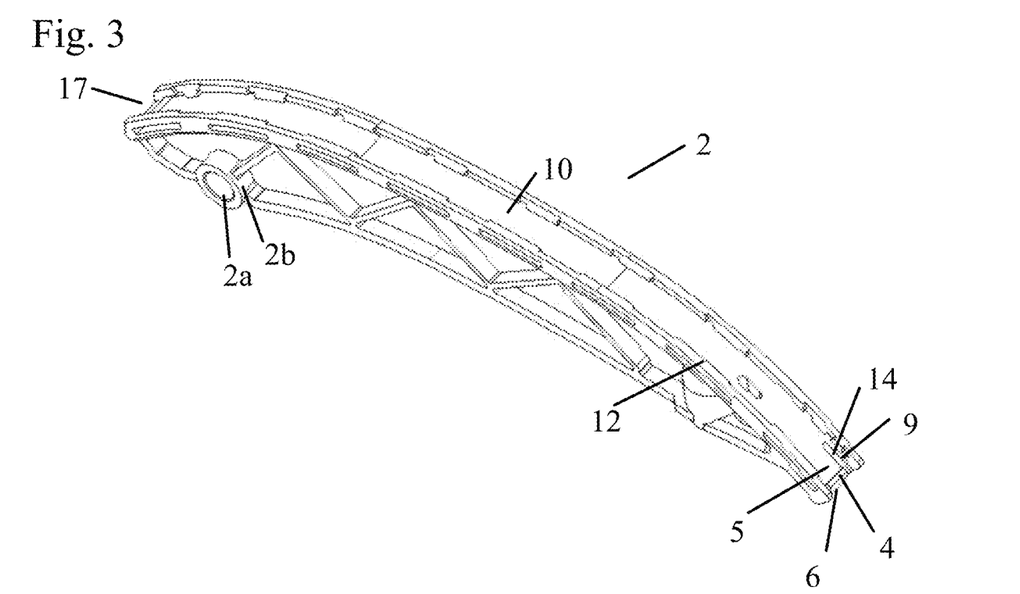
FIG. 3 shows a tensioner arm or guide main body.
Figure 4:
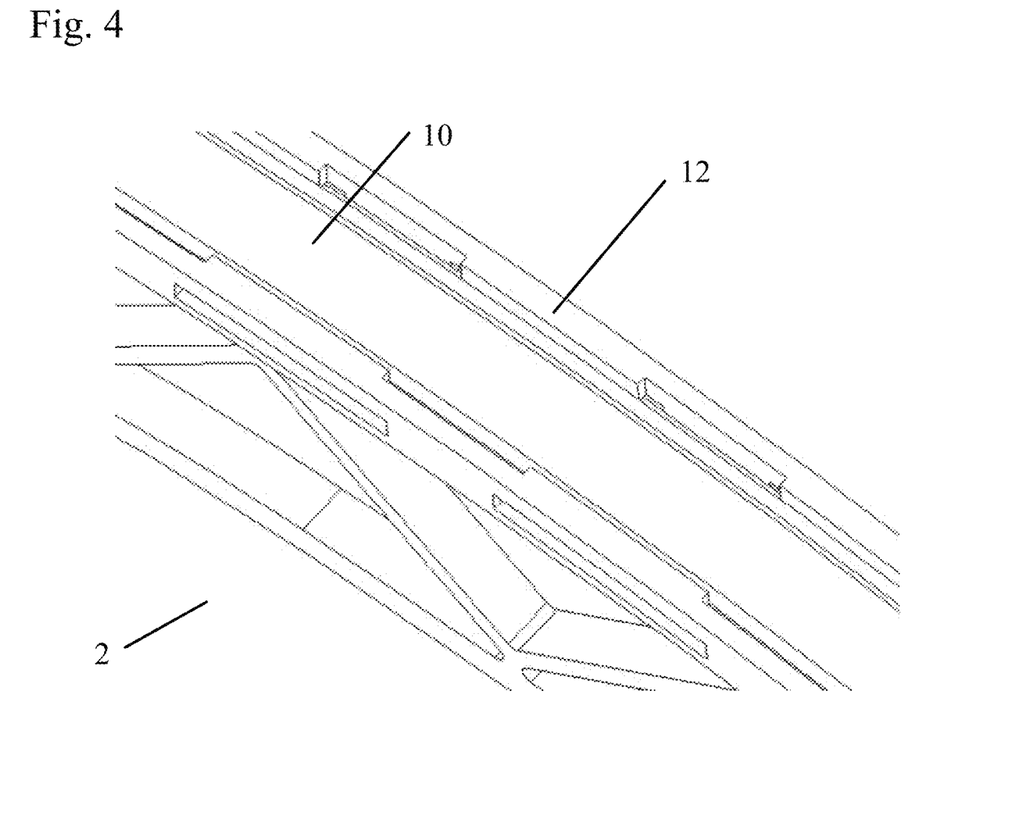
FIG. 4 shows a close up view of the main body.

FIGS. 1-5 show a chain tensioner arm or guide 1 with a main body 2 having at a first end a boss part 2b with a pivot hole 2a passing therethrough and a shoe 3 which can be slid into the base upper surface 10 of the main body 2. FIG. 1A shows the tensioner arm or guide pre-assembly, with the hook end 6 of the main body 2 separate from the shoe 3. FIG. 1B shows a deformed hook end 6 during assembly. FIGS. 2A and 2B show the tensioner arm or guide post-assembly, with the hook end 6 of the main body 2 holding in the shoe 3 after the shoe 3 has been inserted into the main body 2. FIGS. 3 and 4 show views of a main body 2.

The main body 2 has a tab 5 on a hook open end 6 for sliding a shoe 3 into the main body 2. The tab 5 is formed by grooves 14 on an end of the main body 2 and includes a hook protrusion 4 that extends upwards from the main body 2. The main body 2 (which includes the tab 5) is preferably molded as a single piece from a reinforced plastic or resin containing glass fibers, for example, but it may alternatively be made of a metal such as diecast aluminum, or it may be reinforced with a metal reinforcing material after the resin has been molded, for example. In preferred embodiments, the shoe 3 is made of plastic or resin.

Grooves 14 extend longitudinally inward from the open end 6 of the main body 2 to the interior of the main body 2 of the base 10. The length for the grooves 14 and the height of the hook protrusion 4 depend on the structure of the tensioner arm or guide main body 2. In some alternative embodiments, the tab 5 is moved to a sidewall, making the grooves 14 unnecessary.

The shoe 3 can slide onto the main body 2 when pressure is exerted downward on the tab 5 to put the main body 2 in an assembly position where the hook protrusion 4 is prevented from blocking sliding entry of the shoe 3, as shown in FIG. 1B. Once the shoe 3 is slid entirely onto the main body 2, the hook protrusion 4 returns to its original, resting position, as shown in FIG. 2B, preventing backward movement of the shoe 3 off the main body 2 during use of the tensioner arm or guide. Surface or ledge 9 preferably formed along the side of the main body 2 also keeps the shoe 3 in place after assembly. A gap 21 between the hook protrusion 4 and the end 18 of the shoe 3 covers tolerance and thermal effects during use.

Figure 5:
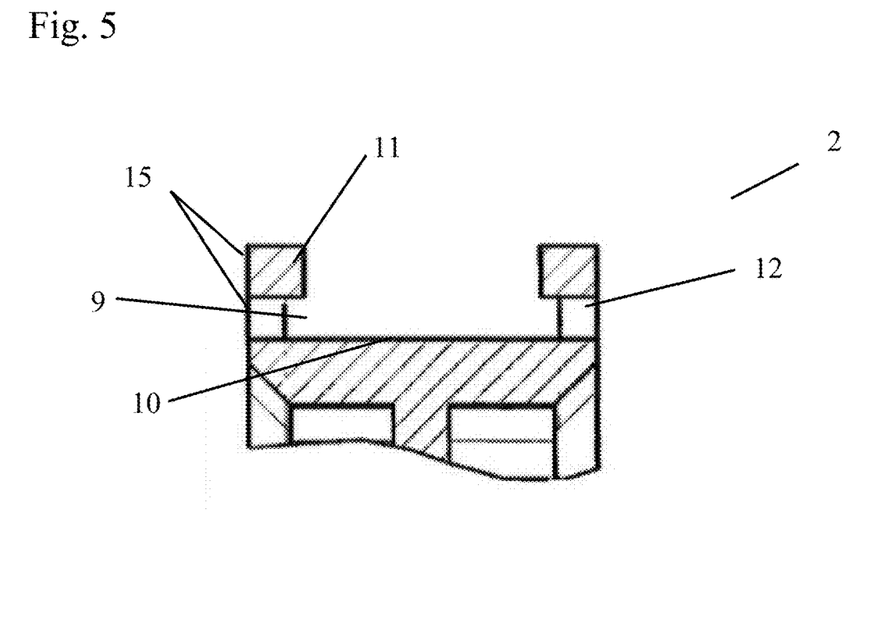
FIG. 5 shows a cross-sectional end view of the main body.

A base upper surface 10 of the main body 2 curves in the shape of an arc. The base upper surface 10 defines a surface that is adjacent a lower surface of the shoe 3 when the shoe 3 is attached. The main body 2 also preferably includes side walls 12. The walls 12 are designed to maintain the curved geometry of the main body 2. The side walls 12 may be continuous (as shown in FIGS. 1-4, 6 and 7) or discontinuous (for example, walls with individual vertical tabs spaced apart from each other). Continuous walls 12 are walls 12 that extend along an entire length of the base upper surface 10 of the main body 2. A continuous wall makes the assembly process easier. FIG. 5 shows a cross-sectional end view of the main body, showing the L-shaped 15 walls 12. The side walls 12 preferably form an inverted L shape 15, with the legs 11 of the "L" 15 partially forming the ledge 9.

The shoe 3 has a chain sliding surface 7 on which a traveling chain (not depicted) slides. A pair of rails 8 extends longitudinally along the chain sliding surface 7 and extends upwards from the chain sliding surface 7. The rails or guides 8 guide the traveling chain. The outermost portion 13 of the shoe 3 fits into the ledge 9 formed on either side of the main body 2 between the base 10 of the main body 2 and the legs 11 of the walls 12. The legs 11 of the walls 12 extend inward towards the center of the tensioner arm or guide main body 2.

Figure 6A:
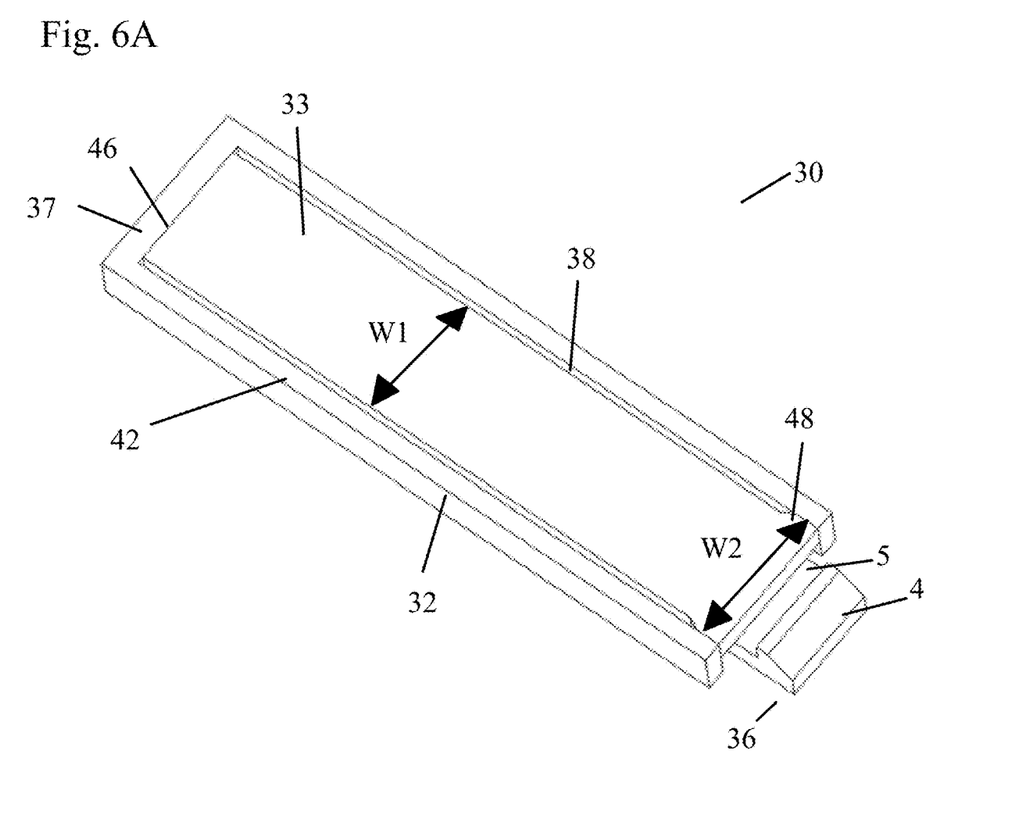
FIG. 6A shows a schematic of a press fit configuration in one embodiment of the present invention.
Figure 6B:
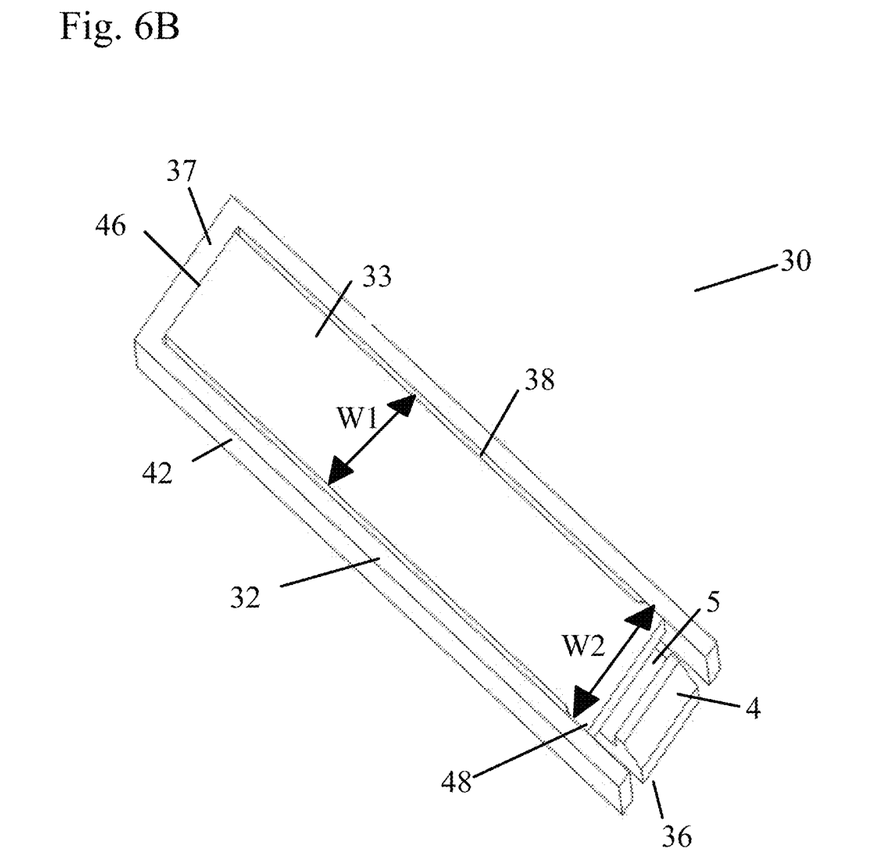
FIG. 6B shows a schematic of a press fit configuration in another embodiment of the present invention.

In preferred embodiments, the first end of the main body includes a tab 5 and the second end of the main body is a closed end 17 (see for example, end 17 in FIGS. 3 and 6). In other embodiments, there is a tab 5 on both ends of the main body 2.

Figures 7A, 7B:
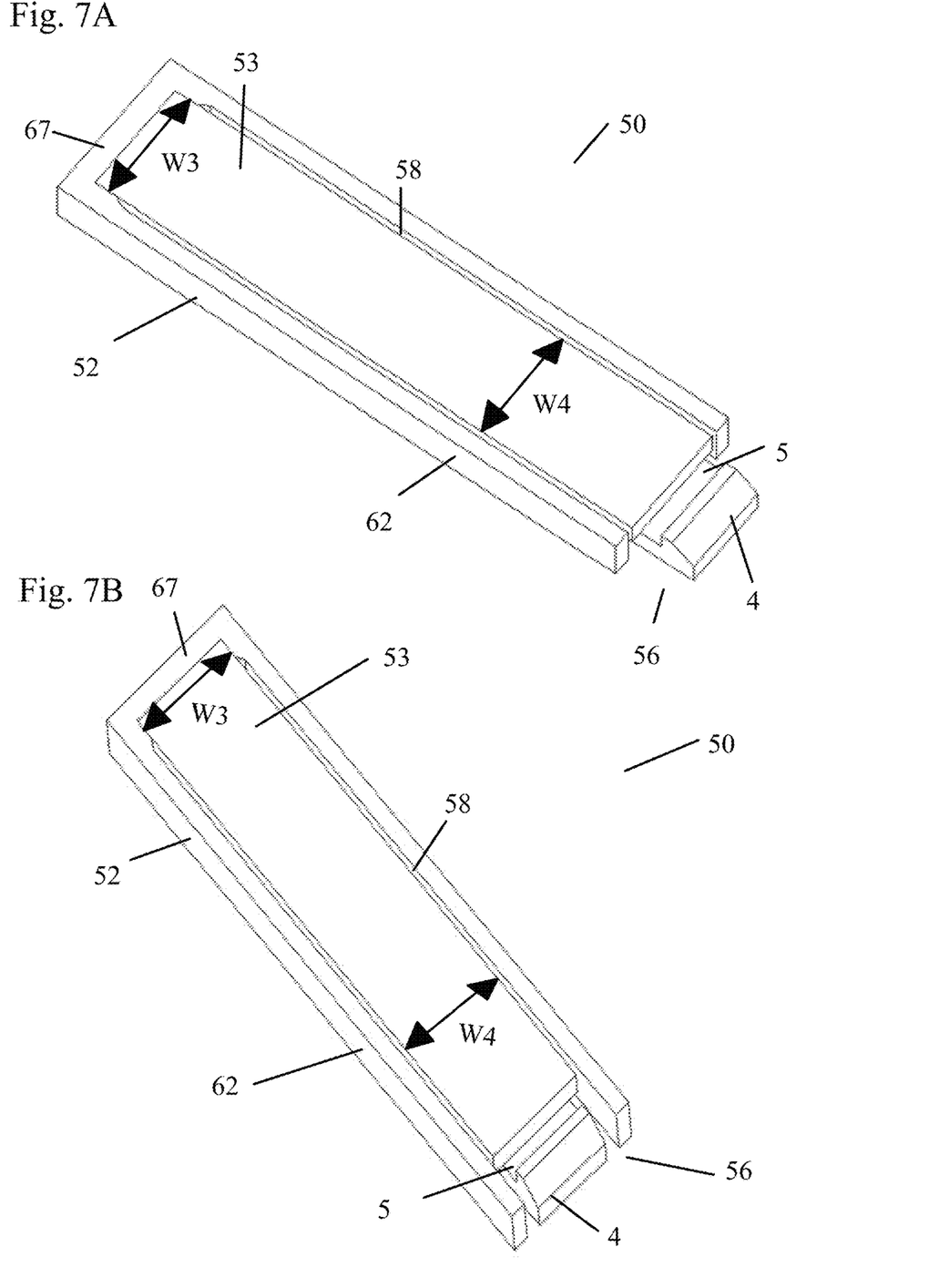
FIG. 7A shows a schematic of a press fit configuration in another embodiment of the present invention.
FIG. 7B shows a schematic of a press fit configuration in another embodiment of the present invention.

While FIGS. 1-5 show tab 5 and hook 4 embodiments where the walls 12 of the main body 2 extend the entire length of the shoe 3, in other embodiments, the walls 12 do not extend to the end 18 of the body 2 (see the walls 12 in FIGS. 6A and 7A).

In a method for assembling the chain tensioner arm or chain guide 1 having the abovementioned structure, in the assembly position, downward pressure is exerted on the tab 5 to remove the hook protrusion 4 from the sliding path of the shoe 3 into the main body 2 (see FIG. 1B). A first end of the shoe 3 is then slid into the open end of the main body 2. The shoe 3 is guided by the ledge 9 and walls 12 of the main body and the shoe 3 is slid towards the other end 17 of the main body 2. Once the shoe 3 has been completely slid into the body 2, the upward hook protrusion 4 of the tab 5 returns to its original, resting position (see FIG. 2B), and prevents the shoe 3 from traveling back out past the upward hook protrusion 4.

FIGS. 10A through 10E show an alternative embodiment of a chain tensioner arm or guide 110, where the tabs 115 are on the shoe 113. FIGS. 10A through 10E differ from FIGS. 1-5 in that, instead of a tab 5 with a hook protrusion 4 on the main body 2, FIGS. 10A through 10E include outwardly protruding tabs 115 on an end of the shoe 113.

The shoe 113 has tabs 115 extending outwardly from both sides of one end 128. The shoe 113 also includes a groove 124 that extends longitudinally inward from the end 128 of the shoe 113. The main body 112 preferably includes side walls 122. The walls 122 are designed to maintain the curved geometry of the main body 112. The side walls 122 may be continuous (as shown in FIGS. 1-4, 6, 7 and 10E) or discontinuous (for example, walls with individual vertical tabs spaced apart from each other). Continuous walls 122 are walls 122 that extend along an entire length of the base upper surface of the main body 112. A continuous wall makes the assembly process easier. The side walls 122 preferably form an inverted L shape 125, with the legs 121 of the "L" 125 partially forming the ledge 119. The side walls 122 include windows or grooves 111 near an end 116 of the main body 112 into which the shoe tabs 115 extend after assembly.

The shoe 113 has a chain sliding surface 117 on which a traveling chain (not depicted) slides. A pair of rails (shown in FIG. 2) extends longitudinally along the chain sliding surface 117 and extends upwards from the chain sliding surface 117. The rails or guides guide the traveling chain. The outermost portion of the shoe 113 fits into the ledge 119 formed on either side of the main body 112 between the base of the main body 112 and the legs 121 of the walls 122. The legs 121 of the walls 122 extend inward towards the center of the tensioner arm main body 112.

Figure 10A:
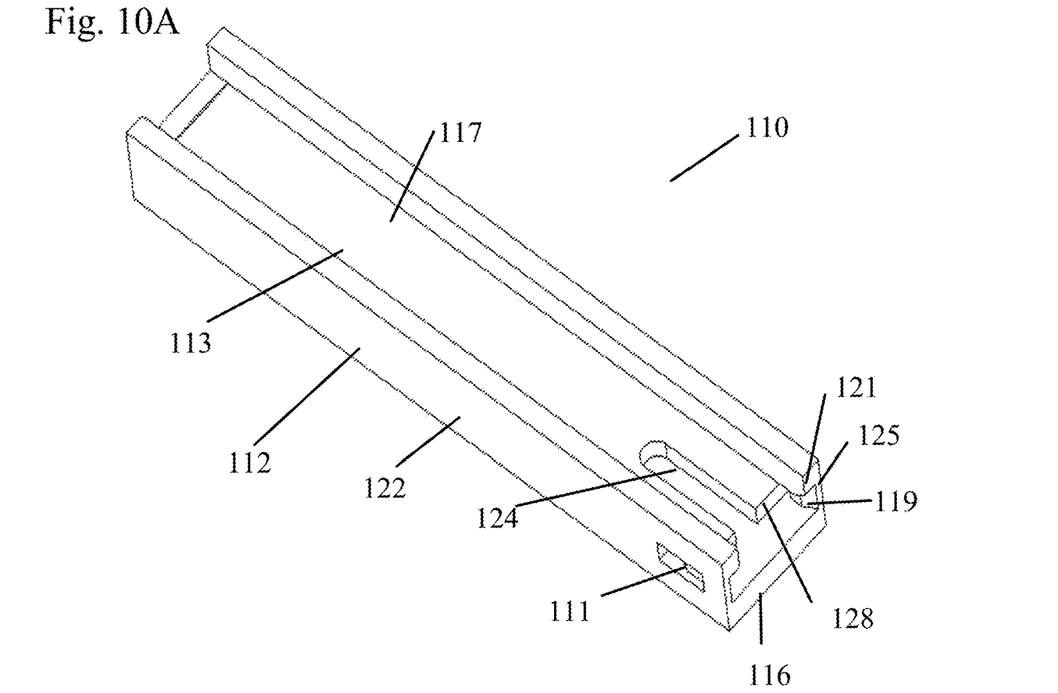
FIG. 10A shows a schematic of another embodiment of a tensioner arm with tabs on the shoe.
Figure 10B:
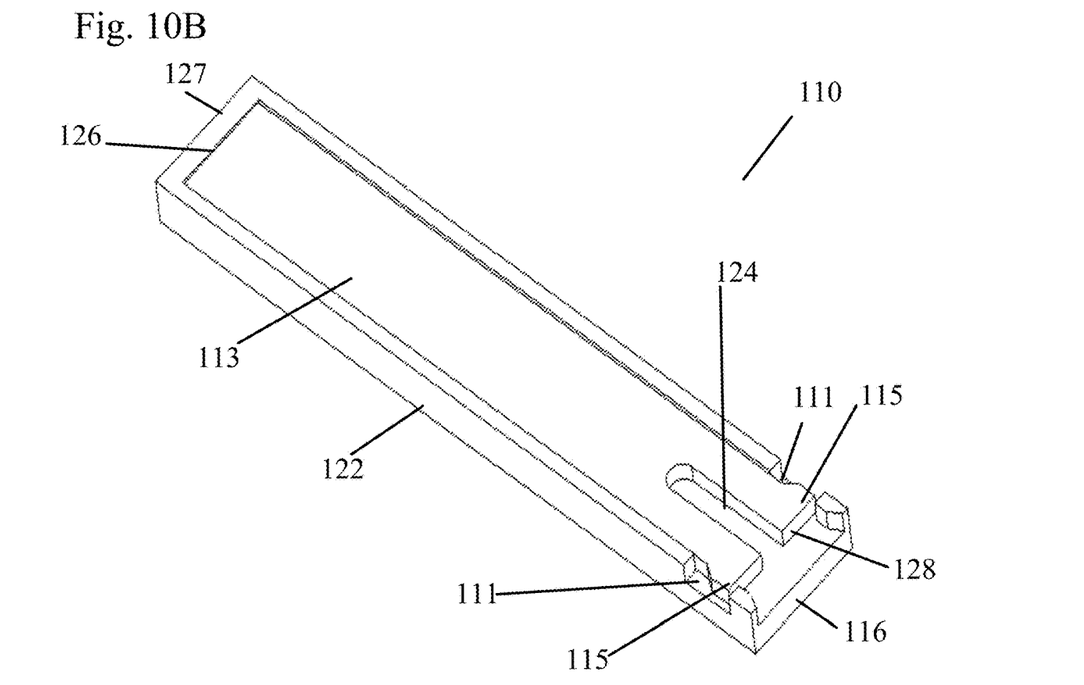
FIG. 10B shows a schematic of the tensioner arm of FIG. 10A with the top of the body removed to show internal geometry.
Figure 10C:
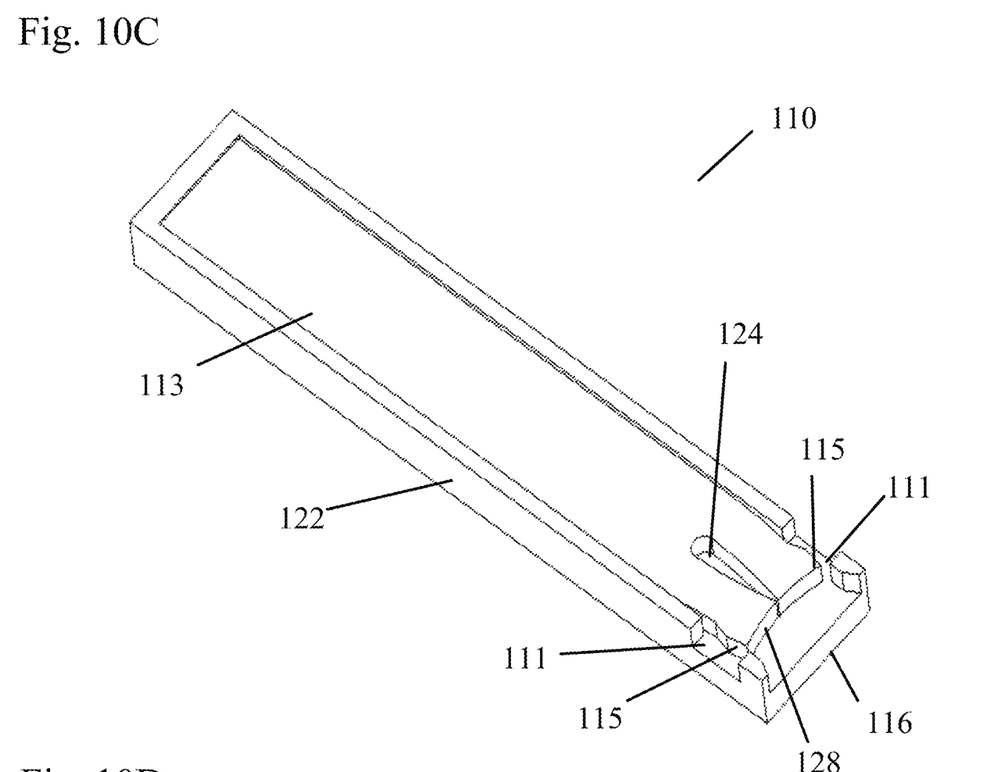
FIG. 10C shows a schematic of the tensioner arm of FIG. 10B with the shoe deformed during assembly.
Figure 10D:
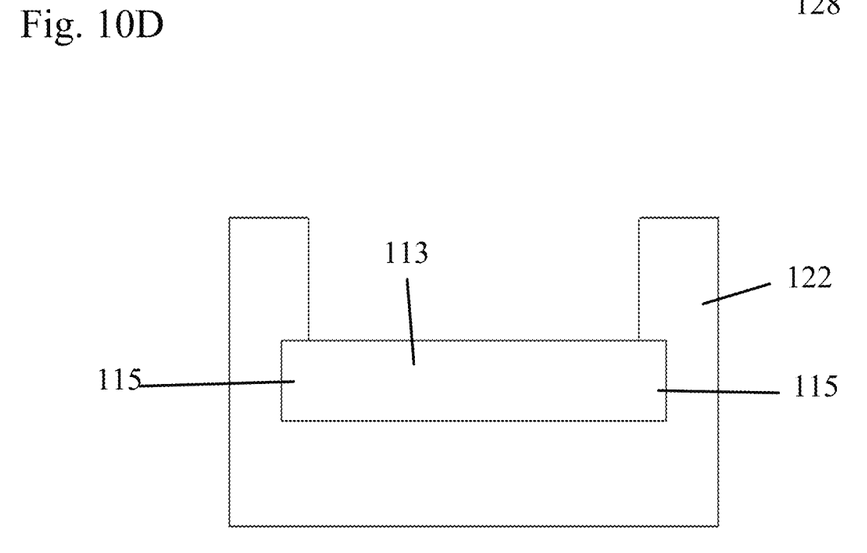
FIG. 10D shows a cross-sectional end view of FIG. 10A.
Figure 10E:
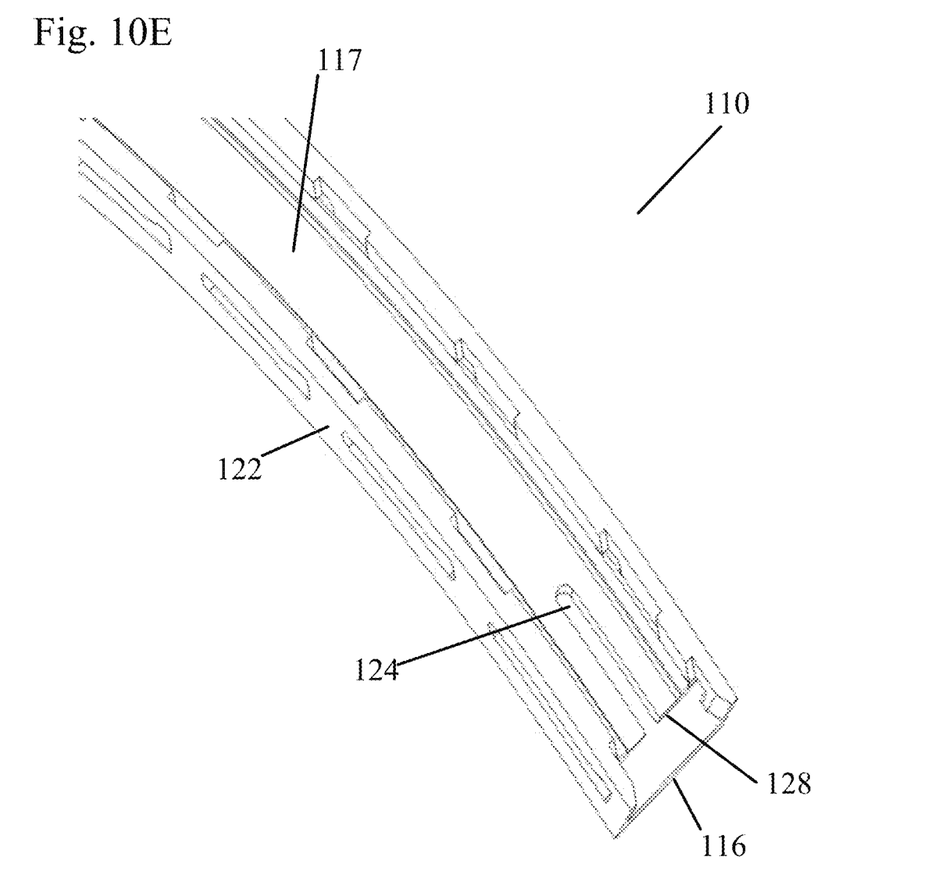
FIG. 10E shows the tensioner arm of FIG. 10A.

The shoe 113 can slide onto the main body 112 when pressure is exerted inward on the shoe tabs 115 to put the shoe 113 in an assembly position where the tabs 115 do not block the shoe 113 from sliding into the main body 112, as shown in FIG. 10C. Once the shoe 113 is slid entirely onto the main body 112, the shoe tabs 115 return to their original, resting position in the grooves 111 of the main body 112, as shown in FIGS. 10A and 10B, preventing backward movement of the shoe 113 off the main body 112 during use of the chain tensioner arm or guide 110. Surface or ledge 119, preferably formed along the side of the main body 112, also keeps the shoe 113 in place after assembly.

In a method for assembling the chain tensioner arm or chain guide 110 having the abovementioned structure, in the assembly position, inward pressure is exerted on the tabs 115 to remove the tabs 115 from the sliding path of the main body side walls 122. A first end 126 of the shoe 113 is then slid into the open end 116 of the main body 112. The shoe 113 is guided by the ledge 119 and walls 122 of the main body and the shoe 113 is slid towards the other end 127 of the main body 112. Once the shoe 113 has been completely slid into the body 112, the side tabs 115 are returned to their original, resting position, in grooves 111 of the side walls 122 of the main body 112, and prevent the shoe 113 from traveling backwards.

Figure 11:
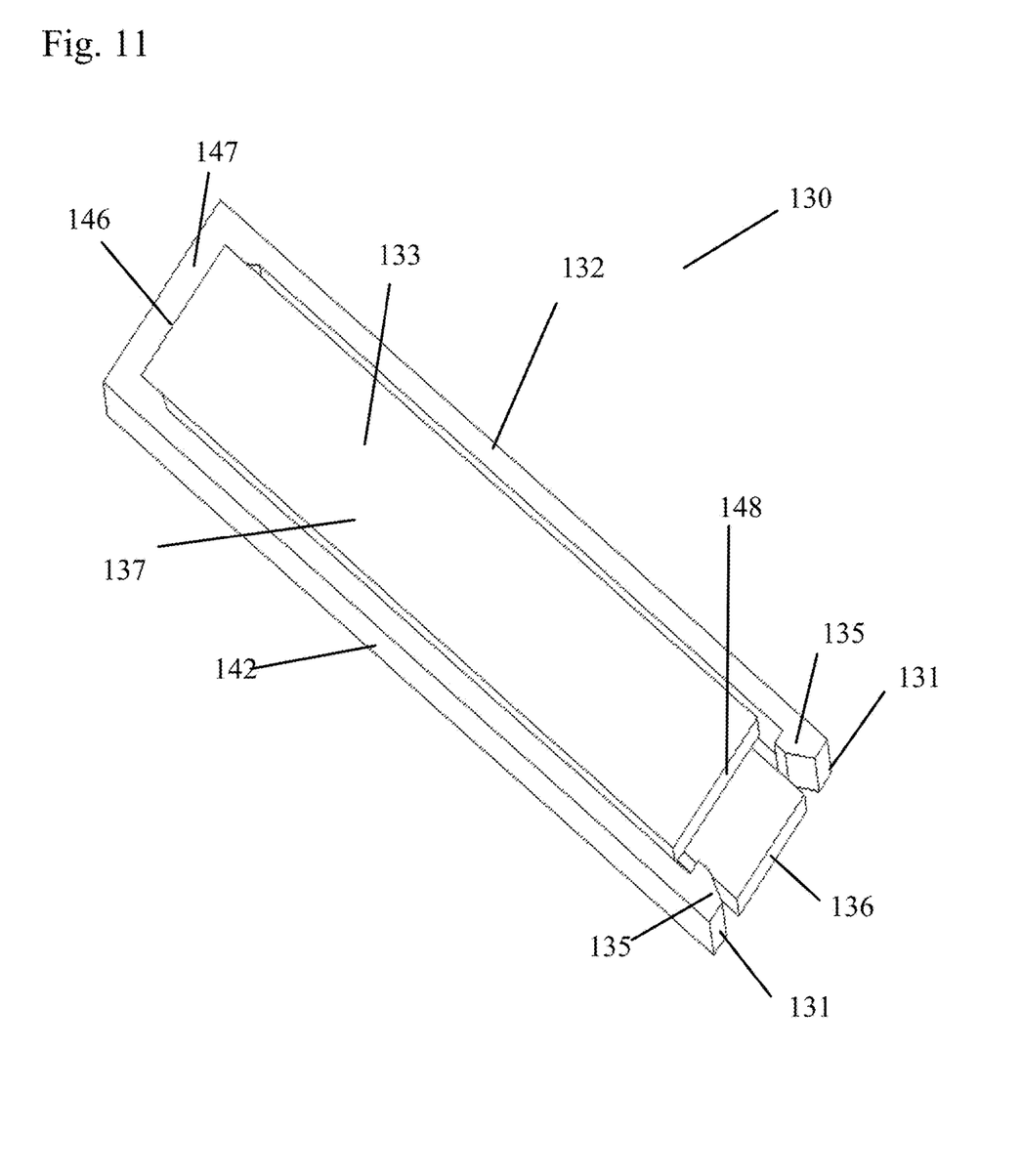
FIG. 11 shows a schematic of a tensioner arm in another embodiment, with a tab on the side walls of the main body.

FIG. 11 shows an alternative embodiment of a chain tensioner arm or guide 130, where the tabs 135 are on the sides of the main body 132. This embodiment is similar to the embodiment shown in FIGS. 1-5, except, instead of a tab 5 and hook protrusion 4 located on the end of the main body 2, there are tabs 135 on the side walls 142 of the main body 132.

The main body 132 has two tabs 135 on the ends 131 of the side walls 142. The shoe 133 can slide onto the main body 132 when pressure is exerted outward on the tabs 135 to put the main body 132 in an assembly position where the tabs 135 are prevented from blocking sliding entry of the shoe 133. Once the shoe 133 is slid entirely onto the main body 132, the tabs 135 return to their original, resting position, preventing backward movement of the shoe 133 off the main body 132 during use of the tensioner arm or guide. The side tabs 135 are preferably sized so that they extend inward farther than each side of the shoe 133 post-assembly. A surface or ledge (shown in FIGS. 1A, 2A, 3, 5, and 10A) preferably formed along the side of the main body 132 also keeps the shoe 133 in place after assembly.

The main body 132 also preferably includes side walls 142. The walls 142 are designed to maintain the curved geometry of the main body 132. The side walls 142 may be continuous (as shown in FIGS. 1-4, 6, 7 and 10E) or discontinuous (for example, walls with individual vertical tabs spaced apart from each other). Continuous walls 142 are walls 142 that extend along an entire length of the base upper surface of the main body 142. A continuous wall makes the assembly process easier. The side walls 142 preferably form an inverted L shape (shown in FIGS. 1A, 2A, 3, 5, and 10A) with the legs of the "L" partially forming the ledge.

The shoe 133 has a chain sliding surface 137 on which a traveling chain (not depicted) slides. A pair of rails (shown in FIG. 2) extends longitudinally along the chain sliding surface 137 and extends upwards from the chain sliding surface 137. The rails or guides guide the traveling chain. The outermost portion of the shoe 133 fits into the ledge formed on either side of the main body 132 between the base of the main body 132 and the legs of the walls. The legs of the walls extend inward towards the center of the tensioner arm or guide main body.

In a method for assembling the chain tensioner arm or chain guide 130 having the abovementioned structure, in the assembly position, outward pressure is exerted on the tabs 135 to remove the side tabs 135 from the sliding path of the shoe 133. A first end 146 of the shoe 133 is then slid into the open end 136 of the main body 132. The shoe 133 is guided by the ledge and walls 142 of the main body 132 and the shoe 133 is slid towards the other end 147 of the main body 132. Once the shoe 133 has been completely slid into the body 132, the side tabs 135 are returned to their original, resting position, extending inward past the sides of the shoe 133 to prevent the shoe 133 from traveling backwards past the main body side tabs 135.

FIGS. 6A and 6B show embodiments of a chain tensioner arm or guide 30 with a main body 32 and a shoe 33, where the shoe 33 can be press fit into the main body 32. The first end 36 of the main body 32 includes a tab 5 and hook protrusion 4 and the second end 37 of the main body 32 is a closed end. FIGS. 6A and 6B differ from each other in the length of the walls 42 along the first end 36. In FIG. 6A, the walls 42 do not extend to the end 36 of the body 42. In FIG. 6B, the walls 42 extend the entire length of the shoe 33.

In these embodiments, the walls 42 of the main body 32 maintain the same distance 20 between each other. For simplicity, the L-shaped walls 42 are shown in FIGS. 6 and 7 as a straight, continuous wall. The majority of the shoe 33, including the end 46 of the shoe 33 that slides into the open end 36 of the tensioner arm main body 32, has a first width W1 narrower than a second width W2 on the other end 36 of the shoe 33, which ensures that the shoe 33 is held in place after assembly. In embodiments using the L-shaped walls 42 discussed above, there is a gap between the narrower W1 shoe sides and the edges of the walls 42, while the wider W2 portion of the shoe 33 extends to the edges of the walls 42. The rails 38 in this embodiment may not extend to the wider W2 portion 48 of the shoe 33, as shown in FIGS. 6A and 6B. However, the rails 38 alternatively could extend to the wider W2 portion 48 of the shoe 33.

FIGS. 7A and 7B show other embodiments of chain tensioner arm or guide 50 with a main body 52 and shoe 53 where the shoe 53 can be press fit into the main body 52. FIGS. 7A and 7B differ from each other in the length of the walls 62 along the first end 56. In FIG. 7A, the walls 62 do not extend to the end 56 of the body 52. In FIG. 7B, the walls 62 extend the entire length of the shoe 53. The first end 56 of the main body 52 includes a tab 5 and hook protrusion 4 and the second end 67 of the main body 52 is a closed end. In this embodiment, the distance W3 between the walls 62 of the main body 52 is narrower at a first end 67 than the distance W4 between the walls 62 along the rest of the length of the main body 52. As shown in the figures, the distance between the walls 62 is smaller W3 at the first end 67 opposite the open end 56 with the tab 5. The shorter distance W3 of the walls 62 at the first end 67 is still wide enough to receive the shoe 53. While the rails 58 of the shoe 53 do not extend to the portion of the shoe 53 at the narrower W3 end of the main body 52 in FIG. 7, in alternative embodiments, the rails 58 may extend along an entire length of the shoe 53. There is preferably a gap between the shoe 53 and the wider distance W4 between the walls 62 in this embodiment. The gap makes assembly easier. The narrower W3 first end 67 of the walls 62 ensures that the shoe 53 fits snugly into the main body 52 and holds the shoe 53 in place after assembly.

Figure 8:
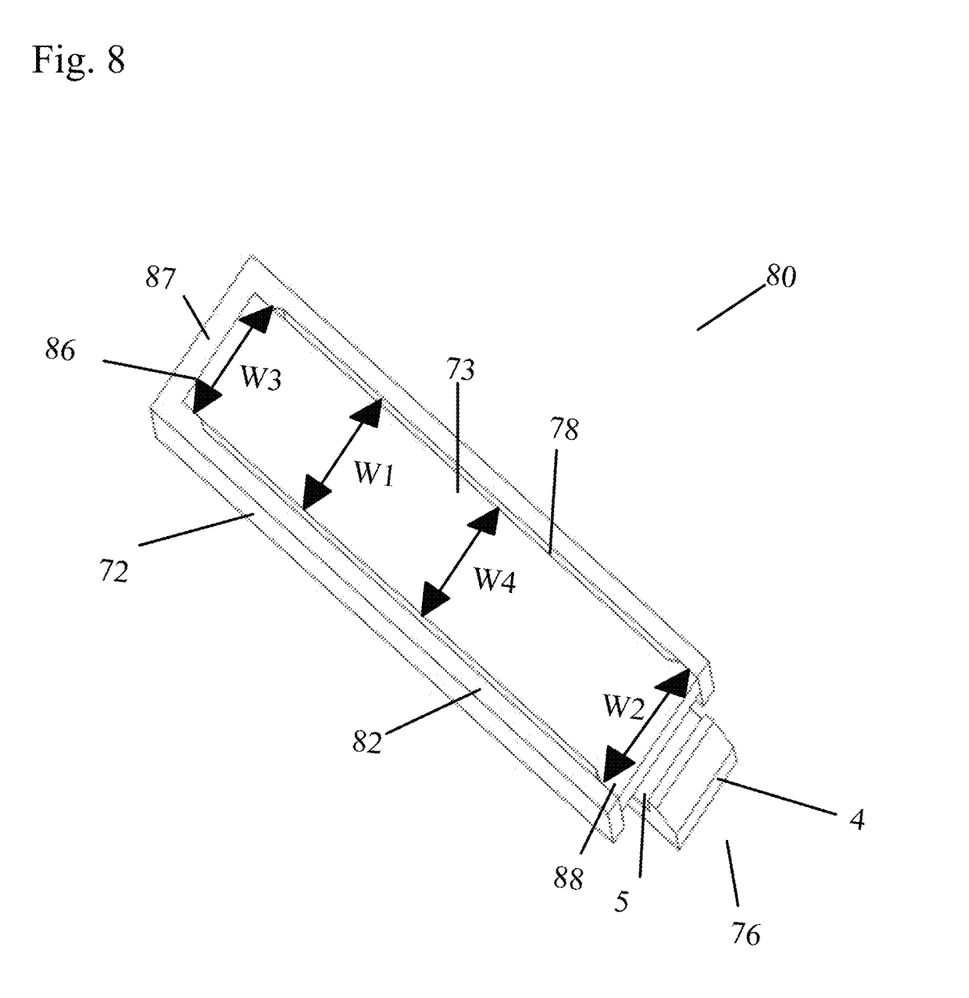
FIG. 8 shows a combination press fit configuration in another embodiment of the present invention.

FIG. 8 shows a chain tensioner arm or guide 70 with press-fit features that combine the embodiments of FIG. 6 and FIG. 7. The first end 76 of the main body 72 includes a tab 5 and hook protrusion 4 and the second end 87 of the main body 72 is a closed end. In these embodiments, the majority of the shoe 73, including the end 86 of the shoe 73 that slides into the open end 76 of the tensioner arm main body 72, has a first width W1 narrower than a second width W2 on the other end 88 of the shoe 73, which ensures that the shoe 73 is held in place after assembly. In addition, the distance W3 between the walls 82 of the main body 72 is narrower at a first end 87 than the distance W4 between the walls along the rest of the length of the main body 72. As shown in the figure, the distance between the walls 82 is smaller W3 at the first end 87 opposite the open end 76 with the tab 5. The shorter distance W3 of the walls 82 at the first end 87 is still wide enough to receive the shoe 73. The narrower W3 first end 87 of the walls 82 ensures that the shoe 73 fits snugly into the main body 72 and holds the shoe 73 in place after assembly. In embodiments using the L-shaped walls 82 discussed above, there is a gap between the narrower W1 shoe sides and the wider distance W4 between the walls 82, while the wider W2 portion of the shoe 73 extends to the edges of the walls 82. The gap makes assembly easier. The rails 78 in this embodiment may not extend to the wider W2 portion 88 of the shoe 73, as shown in FIG. 8. However, the rails 78 alternatively could extend to the wider W2 portion 88 of the shoe 73.

Figure 9A:
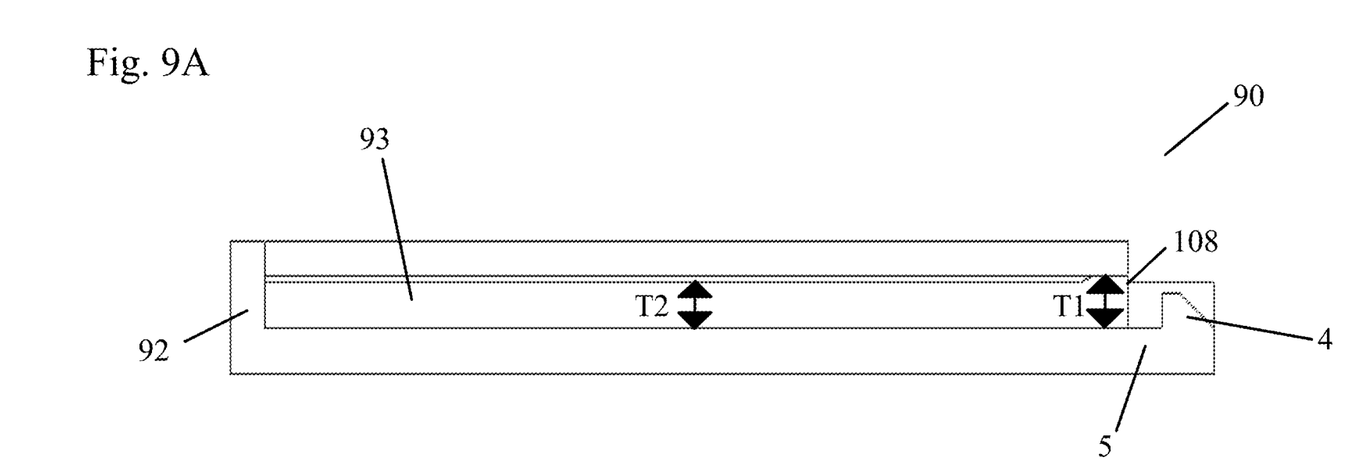
FIG. 9A shows a press fit configuration in the thickness direction in another embodiment of the present invention.
Figure 9B:
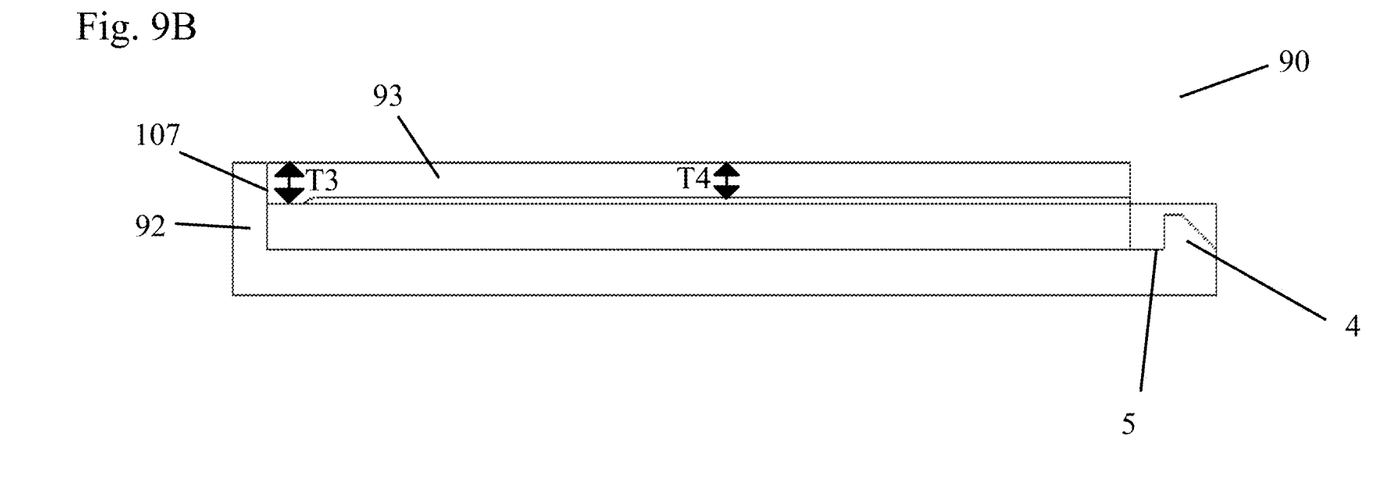
FIG. 9B shows another press fit configuration in the thickness direction in another embodiment of the present invention.

FIGS. 9A and 9B show embodiments where the thickness of the shoe 93 and/or body 92 of a chain tensioner arm or guide 90 vary to create the press-fit feature. In FIG. 9A, the shoe 93 has a larger thickness T1 at one end 108 than the thickness T2 along the rest of the shoe 93. In FIG. 9B, the body 92 is thicker T3 at one 107 of the ends than a thickness T4 of the rest of the body 92. In FIG. 9A, the shoe 93 is thicker T1 at the same end 108 where the hook 4 and tab 5 are located and in FIG. 9B, the body 92 is thicker T3 at the opposite end 107. In an alternative embodiment, which combines the thickness press-fit features of FIGS. 9A and 9B, the shoe has a larger thickness at one end and the body is thicker at the end opposite the end where the shoe is thicker.

While FIGS. 8 and 9 show embodiments where the walls 82, 102 of the main body 72, 92 do not extend the entire length of the shoe 73, 93, in other embodiments, the walls extend to the end of the body (see FIGS. 6B and 7B).

The press fit features described in FIGS. 6 through 9 could be used separately or in combination with the tab features of FIGS. 1 through 5, FIG. 10 or FIG. 11. Similarly, the continuous L-shaped walls or discontinuous walls could be used separately or in combination with either the tab features, the press fit features, or both the tab features and the press-fit features.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A tensioner arm or chain guide for applying tensioning force to a chain, comprising:
   a main body extending in a longitudinal direction comprising side walls, each defining a ledge, the main body having a first end comprising a first tab formed by a set of first grooves extending inwardly from the first end towards a center of the main body, and having a first tab end, the first tab end comprising a first protrusion extending away from the main body; and
   a shoe having a chain sliding surface on which the chain slides, comprising a side protrusion extending in a longitudinal direction along each side of the shoe, wherein the side protrusion fits into the ledge of the main body.

2. The tensioner arm or chain guide of claim 1, wherein the main body has a second closed end opposite the first end.

3. The tensioner arm or chain guide of claim 1, wherein the side walls form an inverted L-shape.

4. The tensioner arm or chain guide of claim 1, wherein the side walls extend continuously along the sides of the main body.

5. The tensioner arm or chain guide of claim 1, wherein the chain sliding surface of the shoe has a first width and a second width, wherein the second width is larger than the first width, wherein the shoe has the first width along at least the middle of the chain sliding surface and the shoe has the second width at at least one end of the shoe.

6. The tensioner arm or chain guide of claim 5, wherein the shoe has the second width at a first end of the shoe, and a distance between the side walls has a third width and a fourth width, wherein the fourth width is narrower than the third width and the fourth width is found on a second end of the main body opposite the first end of the shoe when the tensioner arm or chain guide is assembled.

7. The tensioner arm or chain guide of claim 1, wherein a distance between the side walls has a first width and a second width, wherein the second width is narrower than the first width and the second width is found on at least one end of the main body.

8. The tensioner arm or chain guide of claim 1, wherein the chain sliding surface of the shoe has a first thickness and a second thickness, wherein the second thickness is larger than the first thickness, wherein the shoe has the first thickness along at least the middle of the chain sliding surface and the shoe has the second thickness at at least one end of the shoe.

9. The tensioner arm or chain guide of claim 1, wherein the main body has a first thickness and a second thickness, wherein the second thickness is larger than the first thickness and the second thickness is found on at least one end of the main body.

10. A method of assembling a tensioner arm or guide for applying tensioning force to a chain, the tensioner arm or guide comprising: a main body extending in a longitudinal direction comprising side walls, each defining a ledge, the main body having a first end and a second end, opposite the first end, the first end comprising a first tab formed by a set of first grooves extending inwardly from the first end towards a center of the main body, and having a first tab end, the first tab end comprising a first protrusion extending away from the main body; and a shoe having a chain sliding surface on which the chain slides, comprising a side protrusion extending in a longitudinal direction along each side of the shoe, wherein the side protrusion fits into the ledge of the main body, the method comprising the steps of:
   exerting a pressure on the first tab of the main body of the tensioner arm or guide at the first end to remove the first protrusion of the first tab from a sliding path defined by side protrusions extending in a longitudinal direction along each side of the shoe and the ledge of the main body; and
   inserting the first end of the shoe into the first end of the main body until the first end of the shoe is received by the second end of the main body.

* * * * *